United States Patent
Ruf

[11] 3,761,070
[45] Sept. 25, 1973

[54] INDEXING DEVICE FOR A STRAIGHT INDEXING TABLE

[75] Inventor: Georg Ruf, Creidtlitz, Germany

[73] Assignee: Kapp & Co., Werkzeugmaschinenfabrik, Coburg, Germany

[22] Filed: July 14, 1971

[21] Appl. No.: 162,385

[30] Foreign Application Priority Data
July 16, 1970 Germany.................. P 20 35 302.0

[52] U.S. Cl.................. 269/59, 74/409, 74/661, 269/63
[51] Int. Cl..... B23q 3/18, F16h 37/06, F16h 35/18
[58] Field of Search.................. 269/55, 58, 59, 63, 269/68, 71; 74/661, 675, 409, 441, 429; 90/56

[56] References Cited
UNITED STATES PATENTS
| | | | |
|---|---|---|---|
| 3,213,711 | 10/1965 | Van Den Keiboom | 74/661 X |
| 2,877,658 | 3/1959 | Anthony | 74/427 X |
| 3,310,998 | 3/1967 | Harmening | 74/661 |
| 2,942,496 | 6/1960 | Dietrich et al. | 74/675 |

Primary Examiner—Harold D. Whitehead
Assistant Examiner—E. F. Desmond
Attorney—Walter Becker

[57] ABSTRACT

An indexing, or positioning, device for a table guided for movement on a base. The positioning device comprises a pair of indexing discs connected via a totalizing transmission with the table to be positioned. Each indexing disc is driven through a differential transmission from a pair of motors, each of which has a brake to lock the motor when it is deenergized. Presettable counters control the motors and a pulse generating device associated with each disc feeds countdown pulses to the counters to stop the disc when a position thereof corresponding to the preset value in the counter is reached. Lost motion in the drive from the positioning device to the table is compensated for by a tensioning drive connected to the table and biasing the table in feed direction during indexing thereof and in the opposite direction at the end of a feed movement thereof.

11 Claims, 12 Drawing Figures

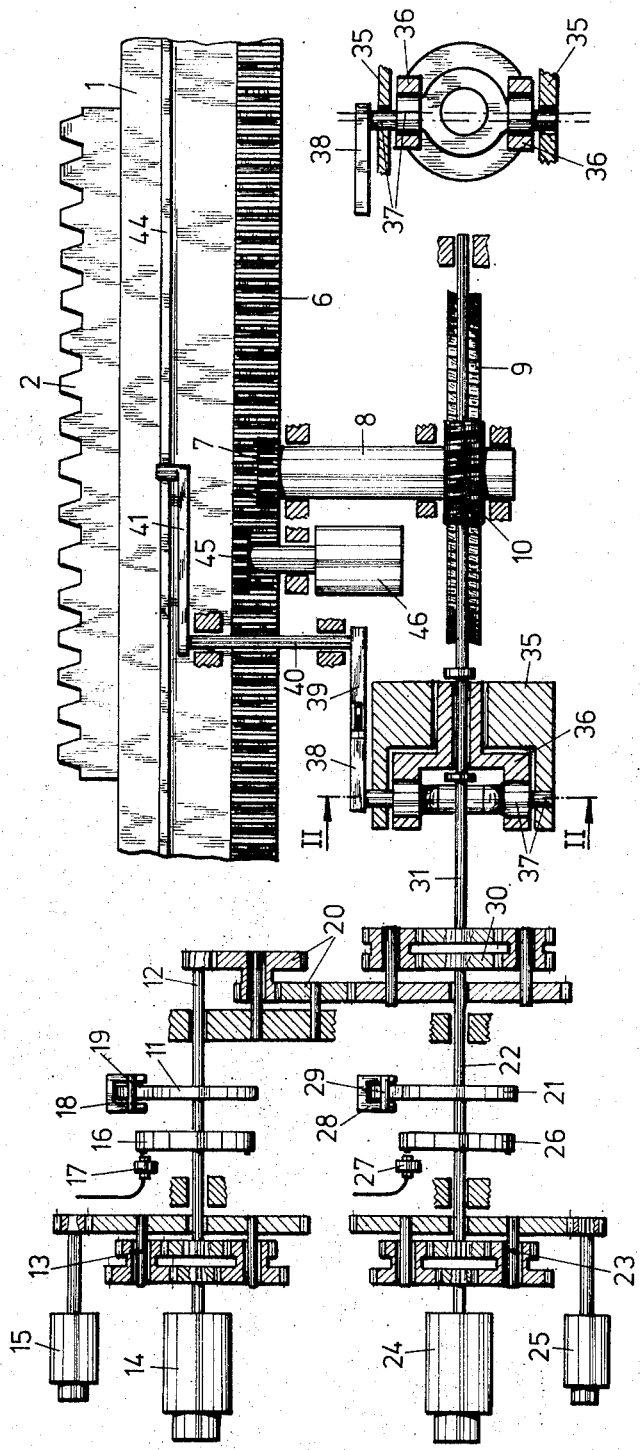

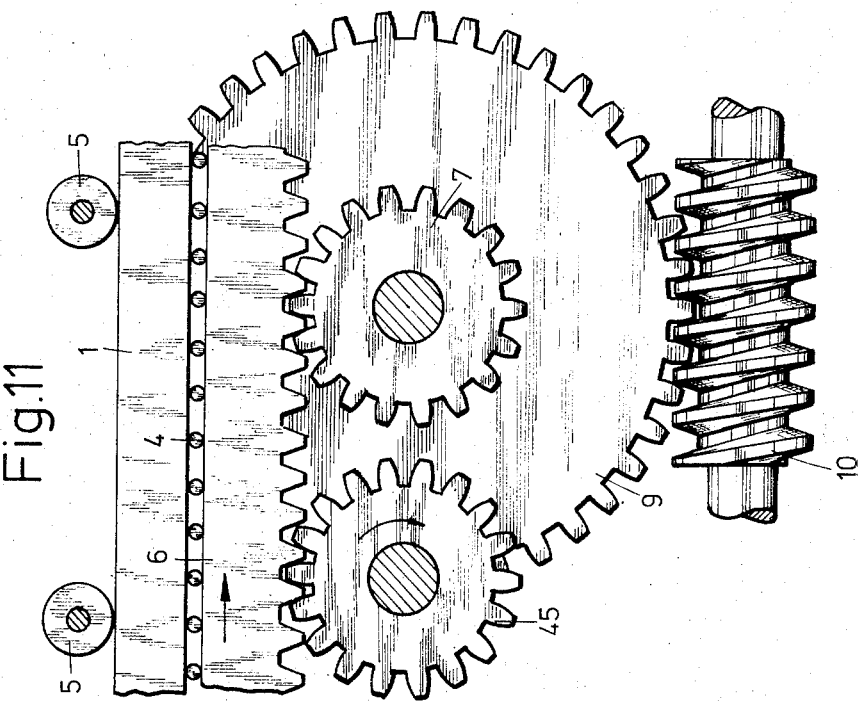
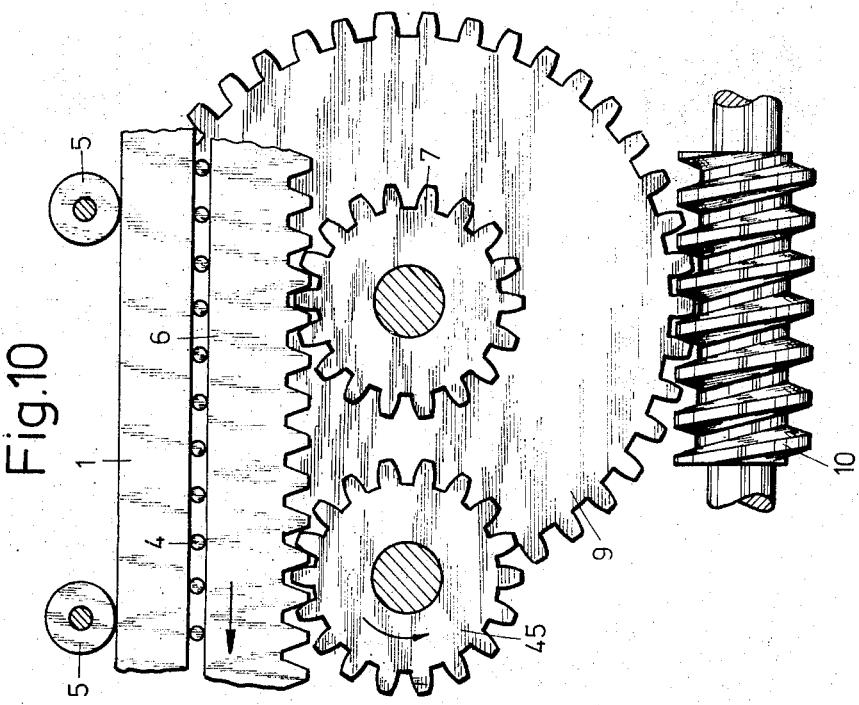

INDEXING DEVICE FOR A STRAIGHT INDEXING TABLE

The present invention relates to an indexing device for a straight indexing table, especially a gear rack grinding machine, for producing high precision divisions of any desired magnitude by means of an indexing disc which is adapted to be driven by a motor and which conveys its movement in conformity with the respective pitch through a transmission to the indexing table supporting the work piece.

Indexing devices of this type are known in which the indexing operation is initiated by an indexing disc which is driven by an electric motor and which through a change gear transmission acts upon a threaded spindle with nut which conveys the pitch to the indexing table. The indexing disc employed in this connection has its circumference provided with a notch or the like and with each indexing operation carries out one revolution only. Therefore, each pitch has to be set by corresponding change gear.

Improved designs of indexing devices as set forth above have become known in which the indexing disc is adapted either to carry out a plurality of preselected revolutions per each indexing operation or in which the indexing disc has its circumference provided with a plurality of notches or the like and consequently can be rotated by a preselected number of notches or notch divisions.

With these heretofore known designs, it is thus possible to set a plurality of different divisions, for instance a certain number of modulus values in conformity with the modulus series according to German Industrial Standards DIN 780. The adjustable modulus values are automatically a multiple of a basic modulus, while the basic modulus is, for instance, $m = 0.25$ and corresponds to one revolution of the indexing disc or one revolution of the indexing disc by one notch pitch.

According to another heretofore known design of an indexing device of the type involved, the change gear transmission is preceded by a quick change gear mechanism in order to increase the number of the modulus values which can be set without exchanging gears.

The heretofore known indexing devices have a number of drawbacks. Thus, none of the heretofore known indexing devices makes it possible quickly and without changing gears to set any desired pitch. For instance with helical gearing it is necessary to increase the pitch of the table relative to the normal pitch of the work piece by the factor $1/\cos \beta$, $\beta$ indicating the angle of skew or slope of the gear rack. For each angle of skew or slope, therefore, a certain change gear combination is necessary. A further drawback consists in that, in view of the required high indexing precision, the transmission ratio set in the gear change transmission must correspond up to many decimals precisely to the rated transmission ratio so that at least three transmission stages are necessary. If, during the exchange of the change gears, the gears are not carefully assembled, there exists the danger of additional indexing errors.

By employing a threaded spindle for driving the indexing table, it has been found that, due to thermal reasons, additional indexing errors may occur on the work piece, above all, errors in the indexing of the total. These additional errors occur when during the machining process temperature differences occur between the work piece and the threaded spindle so that the work piece and the threaded spindle lengthen or shortened differently. Inasmuch as the work piece rests on the indexing table over its entire length and therefore has a very good thermal contact with the indexing table, its temperature is for all practical purposes identical to that of the indexing table. On the other hand, the threaded spindle has a very poor thermal contact with the indexing table so that as a result of heat conveyed to the work piece, for instance, by the heat developed during a cutting operation or the heat of the cooling medium, a considerable time delay occurs during the adaptation of the temperature of the threaded spindle to the temperature of the work piece and of the indexing table. Finally, in view of the unequal radiation conditions, such differences in temperature will continue over a rather long period of time.

By means of the heretofore known indexing devices it is furthermore not possible to carry out the indexing operations in both table directions with work pieces which have to be produced in a plurality of indexing cycles. This is due to the fact that the indexing positions of the table will during the indexing operation be displaced in one direction relative to the indexing in the other direction in view of the transmission play in the indexing system. By indexing cycle is meant a number of successive indexing operations in conformity with the work piece, which indexing operations are carried out in one direction of the table. In such instances it is thus necessary with heretofore known indexing devices, following a completed indexing cycle, to move the indexing table again to its starting position prior to the starting of a new indexing cycle.

Finally, the heretofore known indexing devices require from six to eight seconds for an indexing operation. These indexing times are according to modern standards considered too long, above all, when the indexing device is to be used for a gear rack grinding machine.

The above outlined drawbacks of the heretofore known indexing devices could be avoided by employing a numerical control for the indexing table. Such control, however, would require too many and expensive parts in view of the required high indexing precision and short indexing times.

It is, therefore, an object of the present invention to provide an indexing device of the above mentioned general type by means of which it will be possible without the necessity of changing gears or other parts to set any desired pitch with a minimum of individual indexing errors and errors in the indexing of the total, and in which the indexing operations can be carried out quickly in both directions with the same precision and alternately without having to return to the starting point of the indexing cycle.

It is another object of this invention to provide an indexing device as set forth in the preceding paragraph, which will be considerably less expensive than numerical controls and which, with regard to those parts that determine the indexing precision, will not be subject or only to a negligible extent to wear even after along period of operation.

These and other objects and advantages of the invention will appear more clearly from the following specification in connection with the accompanying drawings, in which:

FIG. 1 is a front view of the most important parts of an indexing device according to the invention.

FIG. 2 is a section taken along the line II—II of FIG. 1.

FIGS. 10 and 11 show a front view of the gear rack with the positioning pinion and the clamping pinion in two different positions.

Figure 3:
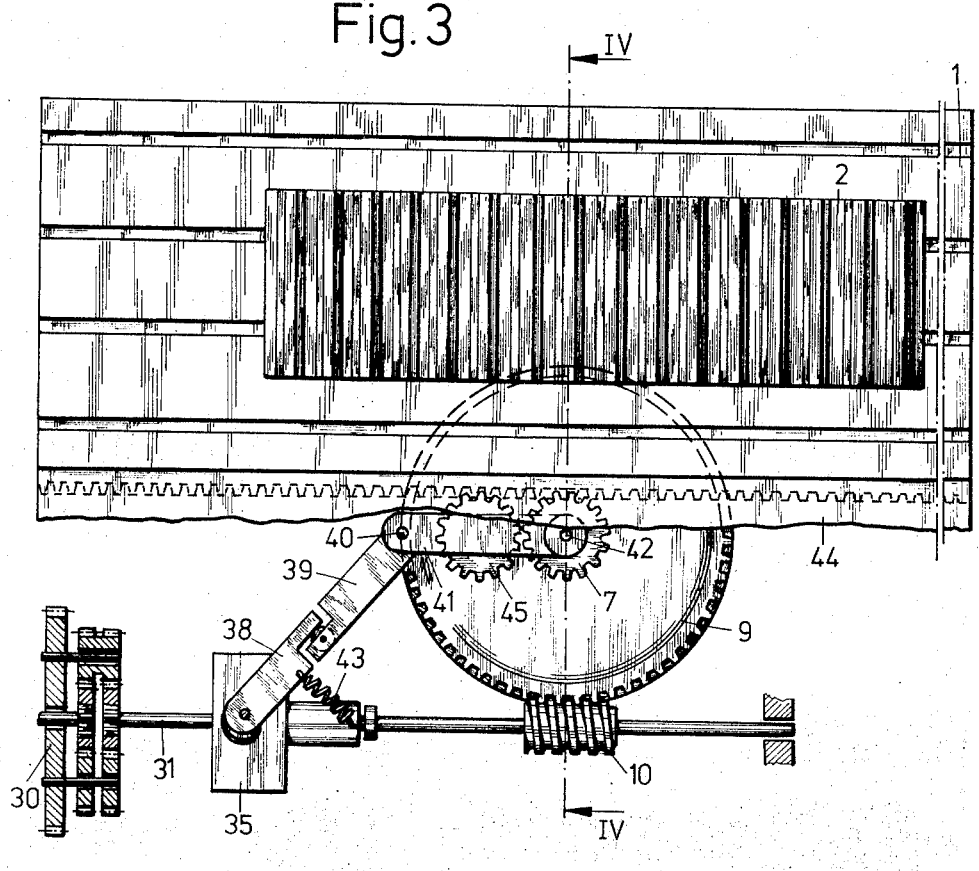
FIG. 3 is a top view of a portion of the device shown in FIG. 1.

The indexing device according to the present invention is characterized primarily in that the indexing factor is composed of a certain number of fine stroke increments and a certain number of coarse stroke increments. In conformity with the present invention, the fine stroke increments are produced by a first indexing disc and the coarse stroke increments are preferably simultaneously produced by means of a second indexing disc, whereupon they are totaled up by a totaling transmission and are conveyed through a drive to the indexing table.

By dividing the indexing factor into fine stroke increments and coarse stroke increments, there is obtained the possibility of dividing the indexing factor into fine sections, for instance of 0.0001 mm, and to adjust the indexing factor to any desired values within a wide range, for instance between from 0 to 100 mm. In view of the employment of two indexing discs and a subsequent totaling transmission, the exchange of gears is eliminated so that the indexing factor can be set very quickly. The control of the indexing operations may, with the system according to the invention, be effected in conformity with the so-called length of the land chain principle (Kettenmassprinzip). With each indexing operation the indexing table is always displaced by the same set number of stroke increments.

According to a further feature of the invention, the drive of the indexing table is effected through the intervention of a gear rack connected to the indexing table, which gear rack meshes with a positioning pinion which is driven by a worm drive comprising a worm wheel and a worm and, more specifically, from the drive shaft of the totaling transmission. For purposes of equalizing the journalling and the tooth play of the worm transmission, of the positioning pinion, and of the gear rack there is provided a drive producing a displacing force. By means of this drive and during the indexing operation, the transporting gear flanks of the worm drive, of the gear rack and of the positioning pinion will come into engagement or will bear and are reversed at the end of the indexing operation so that in the end position, the abutment gear flanks will come into engagement or will bear. As drive, it is, according to the further feature of the invention, suggested to provide a clamping pinion meshing with the gear rack, the pinion being driven by a hydraulic motor.

This further development of the invention brings about that the drive of the indexing table will be able to adapt itself to a temperature change of the indexing table in view of the supply of heat or the withdrawal of heat and will do so as fas as the work piece, so that in particular errors in the indexing of the total due to temperature differences will be avoided. At the same time it will be assured that the indexing position of the indexing table will not be displaced during the indexing in one direction relative to the indexing in the other direction so that the indexing operations can be carried out in both directions with the same precision and alternately without returning to the starting point.

A wear of the parts which determine the indexing precision will be reduced to a minimum because during the indexing operation only the transporting gear flanks engage each other whereas the end position is determined by the abutment gear flanks.

With an indexing device according to the invention with the above mentioned figures, for instance an individual indexing error of the indexing table is obtained of ± 0.002 mm, and an error in the indexing of the total is obtained which per meter table stroke amounts to ± 0.01 mm.

In conformity with the invention, each indexing disc is driven by two brake motors for a fast and a crawl speed and a differential transmission. The brake motors respectively associated with the indexing discs are controlled by an angle pace maker consisting of a pulse disc and a pulse emitter, and by an electronic counter control which comprises number preselector switches, a counter, an evaluator and an outlet relay.

Inasmuch as the positioning drives for both indexing discs, which positioning drives are controlled by the angle pace makers, operate simultaneously, the maximum indexing time for an indexing operation corresponds to the maximum positioning time of one of the two positioning drives. By the employment of a brake motor each for a fast traverse movement and for a crawl movement, the advantages are obtained that, due to the higher transmission ratio, a crawl speed-brake motor with relatively low output may be employed and that for this reason, in view of the slow-down rotation (Nachlaufdrehung) which decreases with decreasing structural size, the crawl speed of this brake motor can be selected relatively high.

In view of a further feature of the invention, each indexing disc has its circumference provided with a number of notches or the like for an indexing pawl which is adapted to be lifted out of the notches or the like against the thrust of a spring. Each indexing pawl is provided with an indexing roller of relatively large diameter which drops into the notches of the indexing disc. The pawls are separated from each other by relatively narrow and pointed guiding members.

This design of the indexing pawls permits a relatively wide variation for the slow-down rotation since the engaging rollers which have a large diameter will together with the narrow guiding members even at great deviations bring about a precise positioning of the indexing disc at the desired spot.

For purposes of compensating for errors in the teeth of the gear rack, of the positioning pinion, of the worm wheel and of the worm, there is, according to the invention, provided a correcting drive which brings about an axial displacement of the worm in conformity with a correcting templet. The correcting transmission comprises a bearing bushing for the shaft carrying the worm, the bearing bushing being axially displaceable within a housing. The bearing bushing is adapted to be controlled by a feeler lever carrying a roller and through the intervention of an eccentric bolt and by a lever drive comprising two levers movable relative to each other and a shaft. This design further increases the precision of the indexing device.

Figure 4:
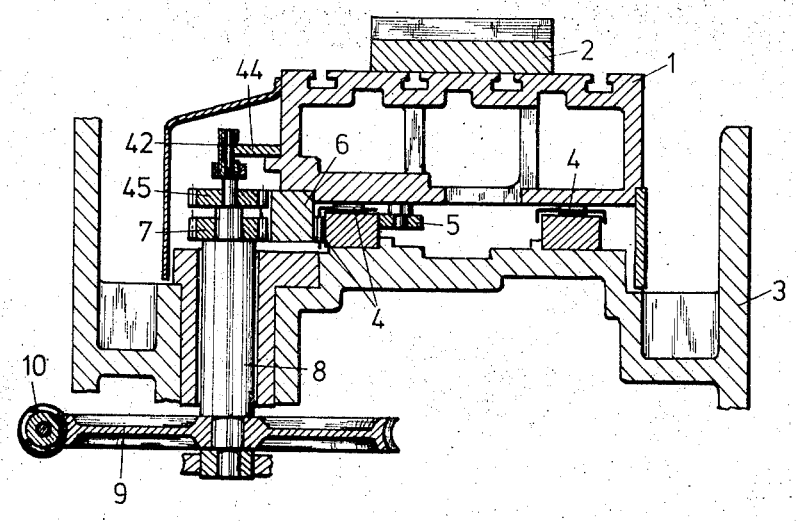
FIG. 4 is a cross section taken along the line IV — IV of FIG. 3.

Referring now to the drawings in detail, the indexing table 1 adapted to be driven exclusively by a translatory movement carries a work piece 2 and by means of roller bodies 4 is journalled in a frictionless manner on a machine bed 3. The lateral guiding of the indexing table 1 is likewise effected by roller bodies 4 and supporting rollers 5 by means of which a play-free lateral guiding will be assured. In this connection reference may be had particularly to FIG. 4.

Laterally below the indexing table 1, a gear rack 6 is connected to the table and is engaged by a positioning pinion 7 which in its turn is connected to a pinion shaft 8. This pinion shaft 8 journalled in the machine bed 3 furthermore supports a worm wheel 9 driven by a worm 10. The angle of rotation of worm 10, in conformity with the desired indexing factor, is determined by a certain number of fine stroke increments and a certain number of coarse stroke increments.

The fine stroke increments and the coarse stroke increments are respectively by means of indexing discs 11 and 21 produced simultaneously while the structure and the operation of the device for driving the two indexing discs 11 and 21 correspond to each other.

As will best be seen from FIG. 1, the indexing disc 11 is mounted on an indexing shaft 12 which through the intervention of a differential transmission 13 is driven either by a brake motor 14 for a fast traverse movement or by a brake motor 15 for a crawl speed. Each of the two brake motors 14 and 15 comprises an ordinary polyphase induction motor and a brake operable to act upon the rotor of the polyphase induction motor. When turning on a brake motor 14 or 15, its brake is simultaneously electrically disengaged. When the brake motor 14 or 15 is again turned off, the brake is immediately engaged and stops the rotor of the motor after a certain slow-down phase. The brake moment will then continue to act through the entire stopping or standstill time. According to a preferred embodiment of the invention, the fast traverse speed of the indexing shaft 12 amounts to 1,250 rpm whereas the crawl speed amounts to 60 rpm.

The brake motors 14 and 15 associated with the indexing disc 11 are controlled by an angle pace maker which is composed of a pulse disc 16 and a pulse emitter 17 and is furthermore controlled by an electronic counter control illustrated in FIG. 12 and to be described further below.

Figure 5:
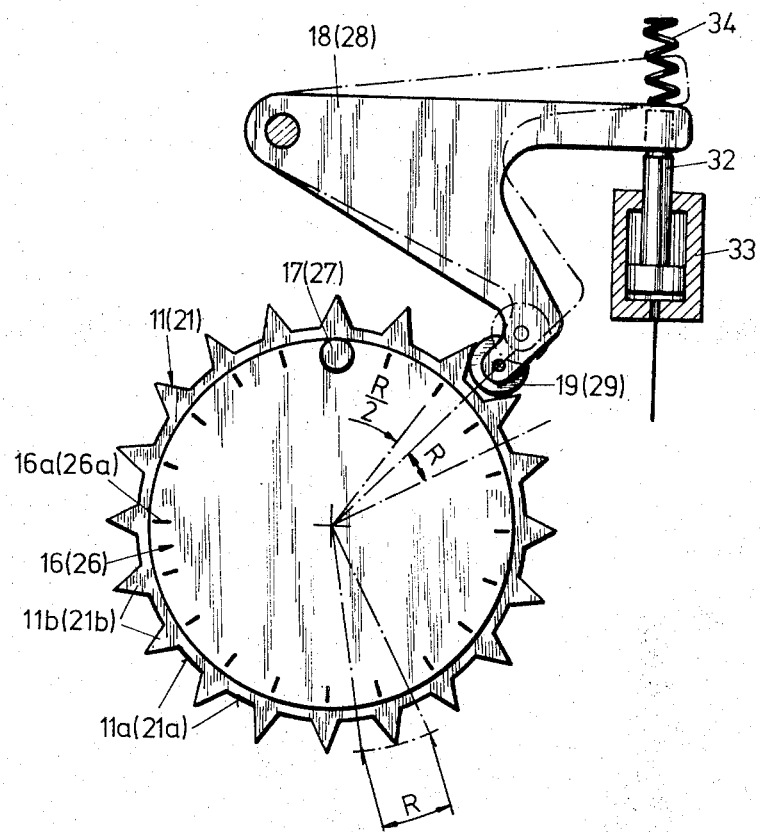
FIG. 5 shows on an enlarged scale a view of an indexing disc with indexing pawl and angle pace maker.
Figure 6:
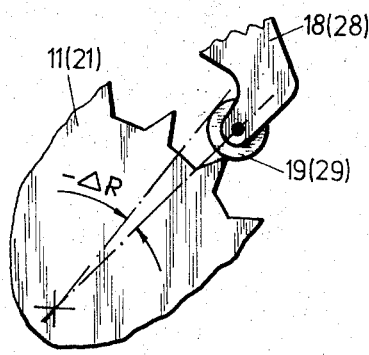
FIGS. 6 and 7 illustrate the indexing pawl in two different positions.
Figure 7:
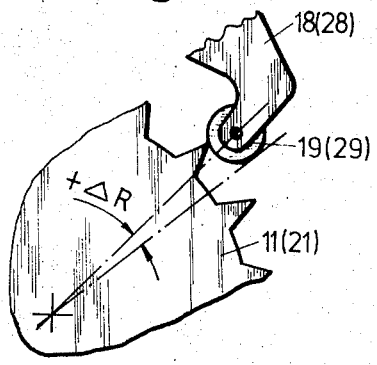

For purposes of controlling the rotation of the indexing disc shaft 12 which may comprise not only complete revolutions but also the revolutions about a predetermined angle, the indexing disc 11 has its circumference provided with a certain number of notches, ratchets, resting steps, or the like 11a which are separated by guiding elements 11b. After a complete rotation of the indexing disc shaft 12, a pawl 18 with a roller 19 engages the notches or ratchets 11a as illustrated in FIGS. 5–7.

While the above described indexing disc 11 with its drive and its control produces the above mentioned fine stroke increments, the coarse stroke increments are produced by the indexing disc 21 which is likewise provided with notches 21a and guiding members 21b. The indexing disc 21 is, in conformity with the above description, mounted on an indexing disc shaft 22 which latter through a differential transmission 23 is driven either by the brake motor 24 for the fast traverse motor 25 or the crawl movement. The indexing disc shaft 22 likewise carries a pulse disc 26 which cooperates with a pulse emitter 24. For purposes of arresting the indexing disc position, there is provided a pawl 28 with a latching roller 29.

The revolutions carried out by the shaft 12 are by means of a stepped transmission 20 conveyed to a totalling transmission 30 to which are also conveyed the revolutions or turning movements of the shaft 22. The output shaft 31 of this totalling transmission 30 has fastened thereto the worm 10 which through the worm wheel 9, the pinion shaft 8 and the positioning pinion 7 displaces the gear rack 6 connected to the indexing table 1.

Figure 12:
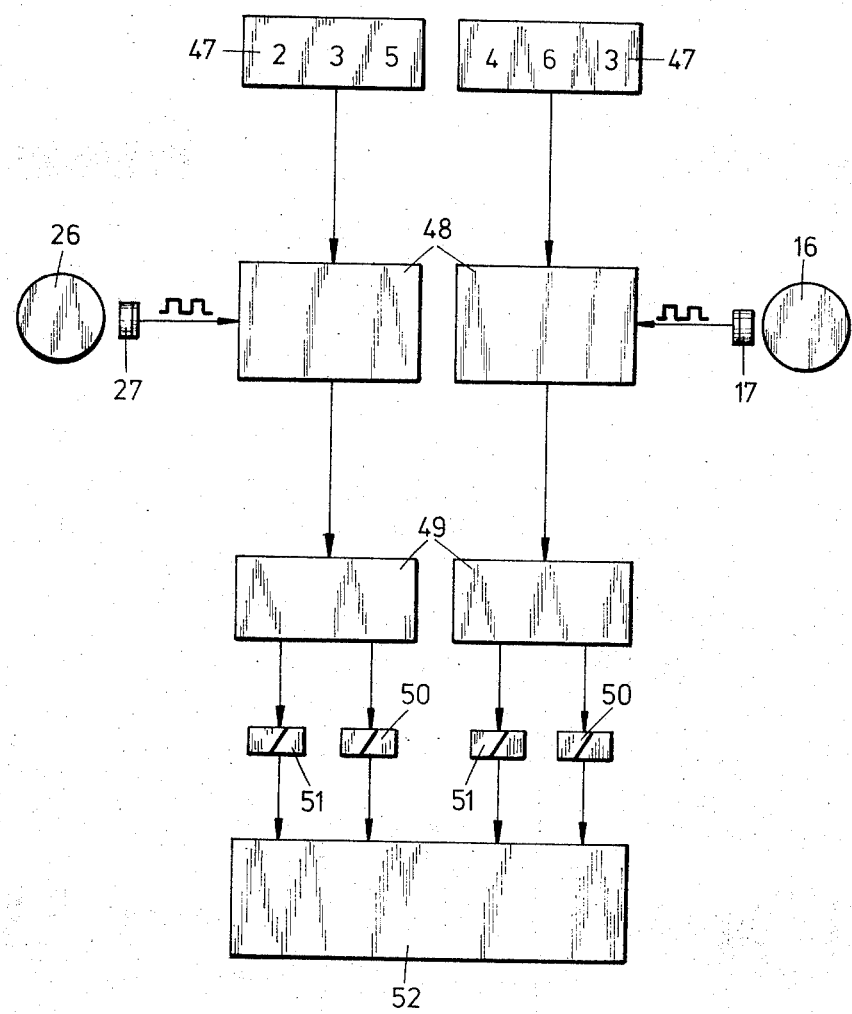
FIG. 12 is a diagram of the electronic counter control.

The above mentioned electronic counter control intended for the drive of the two shafts 12 and 22 is, in conformity with FIG. 12, equipped with two number preselector switches 47 by means of which the number of the desired fine and coarse stroke increments is set. The set numbers are taken over into a following counter 48. Simultaneously, a relay 50 turns on the brake motor 14 for the fast traverse movement in a direction of rotation which corresponds to the indexing direction of the indexing table 1. As a result thereof, indexing disc shaft 12 begins to rotate while the pulse emitter 17 from the pulse disc 16 receives pulses which are produced by the markings 16a on the pulse disc 16. These markings 16a are, in conformity with the number of the ratchets 11a arranged on the indexing disc 11 but are phase displaced by half a resting index with regard to the ratchets 11a. This is clearly shown in FIG. 5.

The pulses coming from the pulse emitter 17 are, in conformity with FIG. 12, conveyed to the counter 48 which in its turn continuously subtracts the incoming pulses from the number which the counter 48 had shown at the start, inasmuch as the counter 48 is designed as rearward counter which means it counts toward zero. In an evaluating device 49 which follows the counter 48, a pre-switch-off point is set which, for instance, may be at 60 pulses. As soon as this pre-switch-off point has been reached, the relay 50a which is actuated when the brake motor 14 is turned on, will drop off and thus will turn off the brake motor 14 for the fast traverse movement. At the same time a relay 51 becomes energized which imparts revolutions upon the brake motor 15 for the crawl stroke through the intervention of a high voltage current control 52. This brake motor 15 now drives at reduced speed the indexing shaft 12 until in the evaluating device 49 the switch-off point has been reached which, for instance, may be at one pulse. Prior to the brake motor 15 being stopped by the brake, it carries out a post-running rotation which may be located at approximately the 1½ ratchet indices. Subsequently, the piston 32 of a pressure cylinder 33 is made pressureless so that the indexing pawl 18 will by the force of a spring 34 be moved from the position shown in dot-dash lines to the position shown in full lines, and in this way through the intervention of the ratchet roller 19 the position of the disc 11 will be fixed. That portion of the indexing factor which is composed of the fine stroke increments has thus been conveyed to the indexing table 1.

Figure 8:
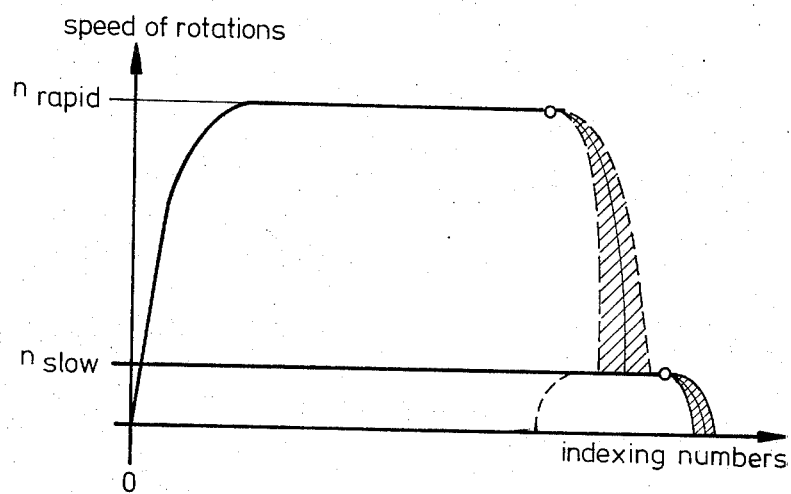
FIG. 8 is a diagram showing the speed-angle of rotation behavior of the indexing disc shafts when positioning the indexing discs.
Figure 9:
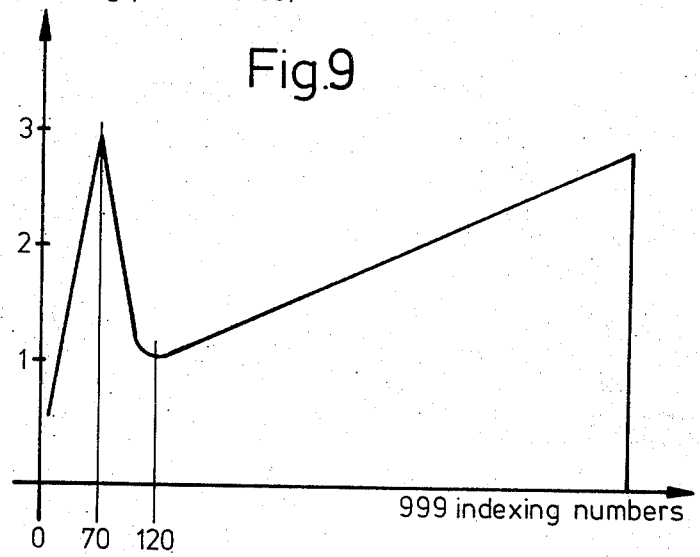
FIG. 9 is a diagram of the positioning times of the indexing discs in conformity with the number of passed through indexing divisions.

At the same time, through a corresponding device the drive and the control of the indexing disc 21, which generates the coarse stroke increments, is effected in a similar manner. In this connection it may, however, be mentioned that when setting a number below 60 on the number preselector switches 47, the brake motor 15, 25 for the crawl speed is immediately turned on so that the brake motor 14, 24 for the fast traverse speed will not become effective at all. The course of the speed in conformity with the course of the ratchet indexing is illustrated in FIG. 8. FIG. 9 shows the required positioning time for the indexing disc 11, 21 in conformity with the number of the ratchet indeces.

According to a preferred embodiment of the invention, the ratchet numbers on the circumference of the indexing discs 11 and 21, and the transmission ratios are so selected that a stroke of the indexing table 1 of 0.0001 mm (fine stroke increment) corresponds to a rotation of the indexing disc 11 from ratchet 11a to ratchet 11a, whereas a table stroke of 0.1 mm (coarse stroke increment) corresponds to a rotation of the indexing disc 21. An indexing factor of 12.5664 mm is thus composed of 125 coarse stroke increments and 644 fine stroke increments. Both indexing discs 11 and 21 are adapted with each indexing operation to be turned by a maximum of 999 ratchet indeces so that indexing factors up to 99.9999 mm can be generated with a dissolution of 0.0001 mm. Inasmuch as the drives for the indexing discs 11 and 21 operate at the same time, the maximum indexing time for an indexing operation corresponds to the maximum positioning time of one of the two drives for the indexing disc 11, 21.

The control of the indexing operations of the indexing table 1 which follow each other is effected in conformity with the so-called length of the land chain principle. In view of the great indexing dissolution or division, the component total indexing error will after hundred indexing operations, with the above selected example, in the most unfavorable instance amount to only ± 0.005 mm. If, for instance, the rated indexing factor amounts to 10.34255 mm, and if on the number preselector switches 47 the indexing factor 10.3426 is set, there will after hundred operations be obtained a length of the land chain error of + 0.005 mm. With a rated indexing factor or magnitude of 10.3429 and a set indexing factor or division of 10.3426 a length of the land chain error of + 0.001 mm is obtained.

With the above described design of the indexing device there will thus be obtained extremely short positioning times. This is due to the fact that on one hand a brake motor 15, 25 with low mass inertia is provided for the crawl speed whereby a very slight slow-down rotation is obtained, while in the other hand due to the special pawl control a relatively high slow-down rotation is admissible. From FIGS. 5 to 7 it will be evident that the ratchet rollers 19, 29 have a relatively large diameter so that ratchets 11a, 21a are obtained on the indexing discs 11, 21 which ratchets are separated from each other by relatively narrow guiding elements 11b, 21b. Due to this geometric design, the slow-down rotation of the indexing disc 11, 21 may vary by ± one third of the ratchet division R because in conformity with FIGS. 6 and 7 even with such a deviation a safe positioning of the indexing disc 11, 21 will be effected by the ratchet roller 19, 29. The roller 19, 29 is by the thrust of spring 34 at the end of the rotation of the indexing disc 11, 21 pressed into the corresponding ratchet 11a, 21a because after completion of the rotation, the piston 32 of the pressure cylinder 33 is no longer under pressure, and the brake of the corresponding polyphase induction motor 14, 24 is turned off for the duration of the engagement of the pawl.

For purposes of an equalization of the play of the bearing and the tooth play of the worm drive composed of worm wheel 9 and worm 10, of the positioning pinion 7, and of the gear rack 6, there is additionally provided a tensioning pinion 45 meshing with the gear rack 6, the pinion 45 being driven by a hydraulic motor 46 (FIG. 1). During the indexing operation which may be effected in one or the other direction, the hydraulic motor 46 furnishes a uniform torque, for instance, in the turning direction indicated in FIG. 10. As a result thereof, a constant displacing force is exerted upon the indexing table 1 in the direction indicated by the arrow whereby the teeth of the positioning pinion 7 and gear rack 6, of worm wheel 9 and worm 10 will engage the so-called transporting gear flanks (left flanks). The oppositely located abutment gear flanks (right flanks) are at that time spaced from each other by the tooth plays. At the end of the positioning operations for the indexing discs 11 and 21 and after engagement of the indexing pawls 18 and 28, the torque of the hydraulic motor 46 is in conformity with FIG. 11 shifted over into the illustration direction whereby the displacement force exerted upon the indexing table 1 will assume a direction indicated by the arrow. The torque and thereby the displacing force retain their magnitude in an unchanged manner. The positioning pinion 7 and the gear rack 6, and the worm wheel 9 and worm 10 now contact each other at the abutment gear flanks (right flanks). It is only now that the indexing table 1 occupies its precise indexing position. Since the movement of the indexing table 1 against the abutment gear flanks (end positioning) is effected always in one direction only, it will be appreciated that the indexing may be effected in one or the other table direction without the indexing positions being displaced. Moreover, the wear of the abutment gear flanks determining the position will be avoided.

In order to compensate for the kinematic errors of the worm drive, positioning pinion 7 and gear rack 6, which kinematic errors cannot be completely avoided, there is provided a correcting drive best shown in FIGS. 1–3. The correction is effected by an axial displacement of the worm 10. To this end, the output shaft 31 which carries the worm 10 is journalled in a bearing bushing 36 which is axially displaceable within housing 34 by an eccentric bolt 37. The rotation of the eccentric bolt 37 is effected by two levers 38 and 39 which between them permit a certain change in length. The axial displacement is effected in conformity with a correcting templet 44 which by means of a feeler roller 42 is sensed by a feeler lever 41, which lever conveys its pivoting movement to a shaft 40 connected to lever 39. Lever 38 will be under the influence of the thrust of a tension spring 43.

When the eccentric bolt 37 is rotated, the bearing bushing 36 and thereby the worm 10 are displaced in axial direction. In order to be able also to compensate for short shaft tooth errors, the diameter of the sensing roller 42 is rather short. The tension spring 43 continuously urges the sensing roller 42 toward the correcting templet 44.

From the above it will be evident that the indexing device according to the invention overcomes the drawbacks of the state of the art as it existed prior to the present invention and fully meets the requirement of modern indexing devices with a minimum of parts and at a minimum of costs which are considerably lower than with indexing devices operating with a numerical control.

It is, of course, to be understood that the present invention is, by no means, limited to the specific construction shown in the accompanying drawings but also comprises any modifications within the scope of the appended claims.

What is claimed is:

1. A positioning device for a table slidable on a base; first means for causing coarse stroke increments of feed of said table, second means for causing fine stroke increments of feed of said table, control means for controlling the operation of said first and second means, and a drive train connecting said first and second means with said table, each of said first and second means including a respective indexing disc and a respective pawl means associated therewith to predetermine indexed positions of the said first and second means, and said drive train including a totalizing transmission having an input member connected to each of said first and second means and an output member connected to said table.

2. A positioning device according to claim 1 in which said drive train also includes a rack on said table parallel to the direction of feed of the table, a positioning pinion meshing with said rack, a worm wheel connected to said positioning pinion, and a worm meshing with said worm wheel and connected to the said output member of said totalizing transmission.

3. A positioning device according to claim 2 which includes a tensioning drive connected to said table, and means for actuating the tensioning drive in one direction during feed of said table to urge the table in feed direction and in the other direction at the end of a feed movement of the table to take up any lost motion in the said drive train from said first and second means to said table.

4. A positioning device according to claim 3 in which said tensioning drive comprises a tensioning pinion meshing with said rack, and a reversible motor connected to said tensioning pinion.

5. A positioning device according to claim 1 which includes a high speed and a low speed drive motor for each disc, a differential transmission for each disc having an output member connected to the respective disc and an input member connected to each of the drive motors for the respective disc, each motor having a brake effective for locking the respective motor when the motor is deenergized.

6. A positioning device according to claim 5 which includes pulse developing means associated with each disc and operable to develop pulses as the respective disc rotates, and presettable counter means connected in controlling relation to said motors, said pulse developing means being connected in controlling relation to said counter means to count down values preset therein as the pertaining disc rotates.

7. A positioning device according to claim 1 in which each disc has a plurality of circumferentially distributed notches on the periphery thereof, and said pawl means engages the notched periphery of the respective disc.

8. A positioning device according to claim 7 in which the said notches in each disc are separated by narrow pointed teeth on the disc, and each pawl means comprising a roller adapted to engage the flanks of the teeth at opposite sides of a notch in each indexed position of the disc.

9. A positioning device according to claim 3 which includes compensating means adapted to shift said worm in the axial direction in response to feed movements of said table to effect correction for errors in the drive train between said first and second means and said table.

10. A positioning device according to claim 9 in which said compensating means comprises a bearing supporting said worm, an eccentric connected to the bearing and actuatable to shift the bearing and worm in the axial direction of the worm, a templet on the table, and a lever system having a roller following the templet and connected to actuate said eccentric in conformity with the contour of said templet as said table moves in feed direction.

11. A positioning device according to claim 8 which includes means for disengaging each pawl means from the respective disc during rotation of the disc.

* * * * *